(12) United States Patent
Henecker

(10) Patent No.: US 12,468,523 B2
(45) Date of Patent: Nov. 11, 2025

(54) METHOD AND SYSTEM FOR UPDATING OPERATING SOFTWARE OF SUBCOMPONENTS OF A MOTOR VEHICLE

(71) Applicant: AUDI AG, Ingolstadt (DE)

(72) Inventor: Frank Henecker, Ernsgaden (DE)

(73) Assignee: AUDI AG, Ingolstadt (DE)

( * ) Notice: Subject to any disclaimer, the term of this patent is extended or adjusted under 35 U.S.C. 154(b) by 335 days.

(21) Appl. No.: 18/454,360

(22) Filed: Aug. 23, 2023

(65) Prior Publication Data

US 2024/0143308 A1    May 2, 2024

(30) Foreign Application Priority Data

Oct. 31, 2022   (DE) .......................... 102022128804.8

(51) Int. Cl.
   *G06F 8/65*    (2018.01)

(52) U.S. Cl.
   CPC ....................... *G06F 8/65* (2013.01)

(58) Field of Classification Search
   CPC ..... G06F 8/60; G06F 8/61; G06F 8/65; G06F 8/70; G06F 8/71
   See application file for complete search history.

(56) References Cited

U.S. PATENT DOCUMENTS

| | | | |
|---|---|---|---|
| 9,766,874 B2* | 9/2017 | Rork | G06Q 10/20 |
| 11,474,802 B2* | 10/2022 | Amano | G06F 8/71 |
| 2017/0242679 A1* | 8/2017 | Sangameswaran | G06F 8/65 |
| 2020/0174779 A1* | 6/2020 | David | G06F 8/654 |
| 2023/0305830 A1* | 9/2023 | Peranandam | G06F 8/65 |

FOREIGN PATENT DOCUMENTS

| | | |
|---|---|---|
| DE | 102018209248 A1 | 12/2019 |
| DE | 102018212214 A1 | 1/2020 |
| DE | 102018124183 A1 | 4/2020 |
| DE | 102019213973 A1 | 6/2020 |
| DE | 102020214378 A1 | 12/2021 |
| DE | 102020214922 A1 | 6/2022 |
| WO | 2016193278 A1 | 12/2016 |
| WO | 2019137773 A1 | 7/2019 |

OTHER PUBLICATIONS

Examination Report issued on Jul. 27, 2023, in corresponding German Application No. 102022128804.8, 8 pages.

* cited by examiner

*Primary Examiner* — Duy Khuong T Nguyen
(74) *Attorney, Agent, or Firm* — Maier & Maier, PLLC

(57) ABSTRACT

A method and a system for updating operating software of subcomponents of a motor vehicle. The updating is not component-specific but vehicle-function-specific.

20 Claims, 2 Drawing Sheets

METHOD AND SYSTEM FOR UPDATING OPERATING SOFTWARE OF SUBCOMPONENTS OF A MOTOR VEHICLE

FIELD

The present invention relates to a method and a system for updating operating software for subcomponents of a motor vehicle.

BACKGROUND

A large number of components are usually installed in today's motor vehicles, for the operation of which component-specific operating software is stored on a memory device of the respective component. If this operating software is further developed, for example to eliminate errors, to improve or expand the functionalities of the respective component, a current version of the respective operating software is usually downloaded from a backend server, triggered by a specific trigger signal, and the outdated operating software is overwritten. The next time the respective component is operated, the respective component is then operated with the current operating software.

In this context, a method for updating a data set stored on a control device is known from DE 10 2018 209 248 A1. The method initially includes a comparison between a target and an actual status of the data set stored on the control unit, wherein the data set is subsequently updated, if necessary.

A system for controlling an update for a vehicle control is known from DE 10 2019 213 973 A1. The system first collects at least one piece of vehicle status information and then updates the vehicle control.

A method for updating a control unit is known from WO 2016 193 278 A1. The method includes a multi-stage process for the update, wherein at least one file in the control unit is updated first and wherein a verification is then carried out.

Sometimes there are malfunctions in motor vehicles after the operating software of components has been updated.

SUMMARY

The object of the present invention is therefore to provide a possible solution in which the risk of impairments in the execution of vehicle functions is reduced after the operating software of components in a motor vehicle has been updated.

The present invention is based on the following considerations: A buyer acquires a vehicle on the basis of its properties and defined functions. A buyer does not acquire the vehicle based on the number or size of components. This customer behavior has become a principle in the system development of vehicles due to the functional orientation. Defined functions are generated and distributed to one or more components, hereinafter subcomponents, based on various criteria, in particular according to the specifications of AUTOSAR (Automotive Open System Architecture). Each of these subcomponents is required so that a respective vehicle function can be used to its full extent. In other words, the vehicle function is made possible by the interaction of different parts, here subcomponents. If the operating software is only updated for a subset of the subcomponents required to implement a specific vehicle function, this can result in the respective subcomponents no longer matching, namely being unable to work together to perform the higher-level vehicle function. The present invention therefore proposes moving away from a component-centric approach to updating and takes the path of updating the operating software depending on the vehicle function, namely the subcomponents required to implement the specific vehicle function.

In other words, in the case of the present invention, the operating software is not updated for individual components, but for higher-level vehicle functions. Since, if necessary, the current operating software is installed on all subcomponents involved in the implementation of the respective vehicle function, execution of the respective vehicle function is ensured. If, upon availability of a new version of the operating software, only the operating software of the respective subcomponent is implemented, it can happen, for example, due to the replacement of a subcomponent as a result of a repair, due to the update of the operating software of a specific subcomponent being missed or the operating software of a specific subcomponent not yet being updated, that the subcomponents are no longer compatible, namely do no longer interact in order to provide the vehicle function implemented therewith. The result would be an error in the desired execution of the vehicle function.

It is therefore possible with the method according to the invention to update defined vehicle functions within the vehicle, for example in order to enable error correction or an improvement in the defined vehicle function. A method according to the invention for updating operating software for subcomponents of a motor vehicle therefore comprises the following steps:

a) detecting a trigger signal for updating the operating software of at least a subset of subcomponents installed in the motor vehicle that require operating software for their operation;

b) determining vehicle functions present in the motor vehicle, the execution of which involves several subcomponents, which represent different components each with their own operating software;

c) identifying at least the subcomponents involved in the execution of a respective determined vehicle function;

d) creating an individual function matrix for at least one specific vehicle function, comprising at least the subcomponents identified for this vehicle function in step c) and the actual status of the respective operating software installed on the plurality of subcomponents;

e) transmitting at least this individual function matrix to a backend server;

f) in the backend server: comparing the actual status of the operating software installed on the subcomponents of the transmitted individual function matrix with a corresponding target status to determine differences between the actual and target status;

g) if a difference between the actual and target status is determined: updating the operating software at least of the subcomponents of the individual function matrix for which a difference between the actual and target status was determined; and h) initializing the at least one vehicle function in which the operating software has been updated for at least one of several subcomponents of the associated individual function matrix.

The term operating software refers to firmware and application software. Firmware is software that is embedded in electronic devices and performs basic functions therein. It occupies an intermediate position between the hardware (namely the physical parts of a device) and the application software, namely the possibly interchangeable programs of a device. It is mostly stored in a flash memory, an EPROM, EEPROM or ROM and cannot be replaced by the user except by using special means or functions. The term derives from the fact that firmware is functionally firmly tied to hardware, meaning that one cannot be used without the other. Firmware refers both to the operating software of various devices or components and to the basic software of a computer that is necessary to load and operate the kernel of the actual operating system. Application software, also called application program, or application for short, is the name given to computer programs that are used to process or support a useful or desired non-system functionality. As mentioned, the term operating software used in the context of the present application includes both firmware and application software.

According to a preferred embodiment, in step d) the individual function matrix is created by including the actual status of artifacts, in particular data sets, and/or external function information that is necessary for executing the respective determined vehicle function. In contrast to the operating software, artifacts are configuration elements, such as characteristic curves and data sets. External function information relates to data provided by other devices, such as sensors, preferably via a communication bus, to the subcomponents mentioned, for example the vehicle speed in a time frame of 10 ms or an outside temperature in ° C. every 10 s.

A typical vehicle function is, for example, blinking. In order to enable blinking on the front of the vehicle, on the rear of the vehicle, on the left-hand side of the vehicle, on the right-hand side of the vehicle, in the rear-view mirror, etc., various control devices, power electronics and the like are required in order to control the respective light sources, preferably LEDs. The control units and components of the power electronics involved are therefore subcomponents of the vehicle function "blinking".

Provision can be made for a plurality of separate operating software to be installed on at least one subcomponent, which separate software is assigned to different vehicle functions and can be correspondingly identified. Accordingly, a specific subcomponent can be part of an individual function matrix for implementing vehicle function A and also part of an individual function matrix for implementing vehicle function B.

The operating software can comprise a number of software blocks, wherein in step f) the actual status of the individual software blocks is then compared with the corresponding target status and in step g) preferably only the software blocks are updated, for which a difference between the actual and target status has been determined in step f). The decisive factor is that now all software blocks involved are checked for their current status while in the prior art an updated version of the software is downloaded only for the software blocks for which it is determined that an updated software is available, without considering the other software blocks that are required to implement a higher-level vehicle function.

In step e), a system function matrix is preferably created from all of the individual function matrices of a motor vehicle and transmitted to the backend server. A system function matrix would thus be a digital representation of the entire vehicle with reference to vehicle functions, for the implementation of which updateable operating software is used. When a system function matrix is transmitted, it can be checked whether all individual function matrices are in a correct status or whether an update is necessary. A system function matrix is therefore a compressed digital representation of the vehicle from a functional point of view.

The trigger signal for step a) is generated in a vehicle function-specific manner, in particular cyclically in the motor vehicle or by a server device external to the vehicle, by input from a user, by a diagnostic device of a vehicle service system, or by determining an "invalid version number" status of at least one individual function matrix, in particular a system function matrix.

If the trigger signal was an "invalid version number", in step f), a comparison can be made in a first step with an individual or system function matrix documented with reference to the vehicle, whereby, in the case of a positive comparison result, only the valid version number of the individual or system function matrix is transmitted to the vehicle and the method is terminated. In this way, the operating software can be secured against accidental or willful manipulation. The fact that the version number is also assigned a status of "valid", in particular by the backend server after the comparison has been made, makes it possible to detect a possible corruption of a vehicle function aboard the vehicle. This means that the consequences of repairs to parts and components that were intended by the manufacturer, but also manipulative interventions by third parties, which are not authorized by the manufacturer, can be reliably determined so that steps can be taken to rectify them. In case of a possibly corrupted vehicle function version, in other words when at least one individual function matrix does not have a valid version number, namely the status of the version number is invalid, this instance is stored in an event memory so that it can be processed by a machine and notified to the driver in a suitable form via a vehicle output device.

If the result of the comparison is negative, in a second step a comparison is made with an individual or system function matrix, which is provided, tested and homologated for the motor vehicle, whereas if the result of the comparison is positive, only the valid version number of the individual or system function matrix is transmitted to the motor vehicle and the method is ended.

If the result of the comparison is negative, the method then proceeds to step g).

The system function matrix is preferably created by sequentially lining up the individual function matrices, preferably in XML or JSON format, and transmitted to the backend server.

Furthermore, the vehicle functions to be determined in step b) are preferably defined as such in advance. This means that vehicle functions are formulated and the subcomponents required for their implementation are named.

In step c), the identification preferably takes place using a name or a data-logistics number, a versioning or unique HASH value, relative to the content of the operating software of the respective subcomponent.

Further preferred embodiments result from the dependent claims.

For applications or situations that can arise in the method and which are not explicitly described here, according to the method, an error message and/or a request for user feedback input is issued and/or a default setting and/or a predetermined initial status are set.

The invention also includes a system for updating operating software for subcomponents of a motor vehicle, comprising a backend server and a motor vehicle with a plurality of subcomponents, a control device and a transceiver, wherein the control device is designed for, upon detection of a trigger signal for updating the operating software of at least a subset of the subcomponents installed in the motor vehicle, which require operating software for their operation, determining vehicle functions present in the motor vehicle, the execution of which involves a plurality of subcomponents, which represent different components each with their own operating software;

identifying at least the subcomponents involved in the execution of a respective determined vehicle function;

creating an individual function matrix for at least one specific vehicle function, comprising at least the subcomponents identified for this vehicle function and the actual status of the operating software installed on each of the plurality of subcomponents;

wherein the transceiver is coupled to the control device and configured to transmit at least this individual function matrix to the backend server;

wherein the backend server is designed for, comparing the actual status of the operating software installed on the subcomponents of the transmitted individual function matrix with a corresponding target status and determining differences between the actual and target status;

if a difference between the actual and target status is determined: causing an update of the operating software at least of the subcomponents of the individual function matrix for which a difference between the actual and target status was determined;

wherein the control device is further designed to initialize the at least one vehicle function for which the operating software of at least one of a plurality of subcomponents of the associated individual function matrix has been updated.

The backend server preferably includes a documentation unit that stores and maintains the vehicle-specific target status of the transmitted individual function matrices and system function matrix.

The control device can have a data processing device or a processor device which is designed to perform an embodiment of the method according to the invention. For this purpose, the processor device can have at least one microprocessor and/or at least one microcontroller and/or at least one FPGA (Field Programmable Gate Array) and/or at least one DSP (Digital Signal Processor). The processor device can also comprise program code, which is designed, upon execution by the processor device, to perform the embodiment of the method according to the invention. The program code can be stored in a data memory of the processor device. A processor circuit of the processor device can have, for example, at least one circuit board and/or at least one SoC (System on Chip).

The invention also includes developments of the system according to the invention, which comprise features which have already been described in conjunction with the developments of the method according to the invention. For this reason, the corresponding developments of the system according to the invention are not described once again here.

The motor vehicle according to the invention is preferably designed as an automobile, in particular as a passenger car or truck, or as a passenger bus or motorcycle.

As a further solution, the invention also comprises a computer-readable storage medium, comprising instructions which, when executed by a computer or a computer network, cause it to execute an embodiment of the method according to the invention. The storage medium can be embodied, for example, at least partially as a non-volatile data memory (such as a flash memory and/or as an SSD—solid state drive) and/or at least partially as a volatile data memory (such as a RAM—random access memory). However, the storage medium can also be operated, for example, as a so-called app store server on the Internet. A processor circuit with at least one microprocessor can be provided by the computer or computer network. The commands can be provided as binary code or assembler and/or as source code of a programming language (such as C).

The invention also comprises the combinations of the features of the described embodiments. The invention also comprises implementations that each have a combination of the features of several of the described embodiments, provided that the embodiments were not described as mutually exclusive.

BRIEF DESCRIPTION OF THE FIGURES

Exemplary embodiments of the invention are described hereinafter. In particular.

DETAILED DESCRIPTION

Figure 1:
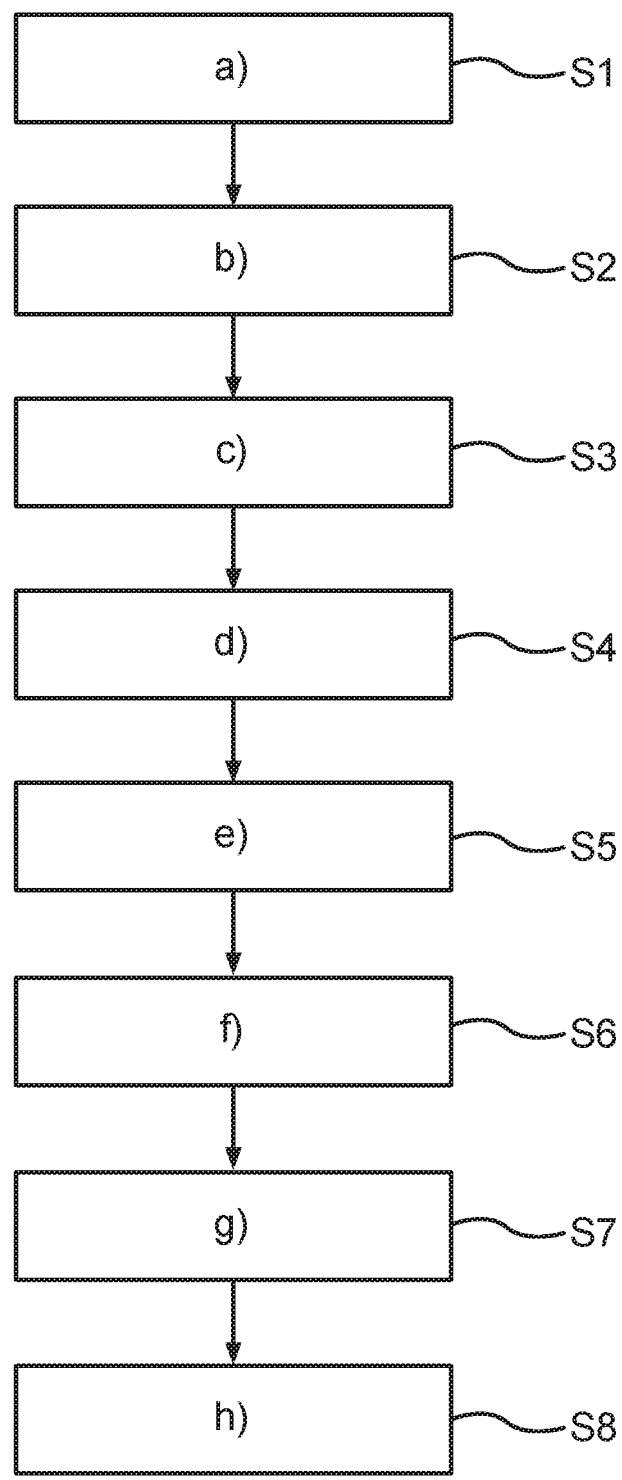
FIG. 1 shows a signal flow chart for an exemplary embodiment of a method according to the invention.

The exemplary embodiments explained hereinafter are preferred embodiments of the invention. In the exemplary embodiments, the described components of the embodiments each represent individual features of the invention to be considered independently of one another, which each also develop the invention independently of one another. Therefore, the disclosure is also intended to comprise combinations of the features of the embodiments other than those represented. Furthermore, the described embodiments can also be supplemented by further ones of the above-described features of the invention.

In the figures, same reference numerals respectively designate elements that have the same function.

FIG. 1 shows a signal flow chart for an exemplary embodiment of a method according to the invention for updating operating software for subcomponents of a motor vehicle. This is explained in conjunction with FIG. 2, which shows a schematic representation of a system according to the invention for updating operating software of subcomponents of a motor vehicle.

Figure 2:
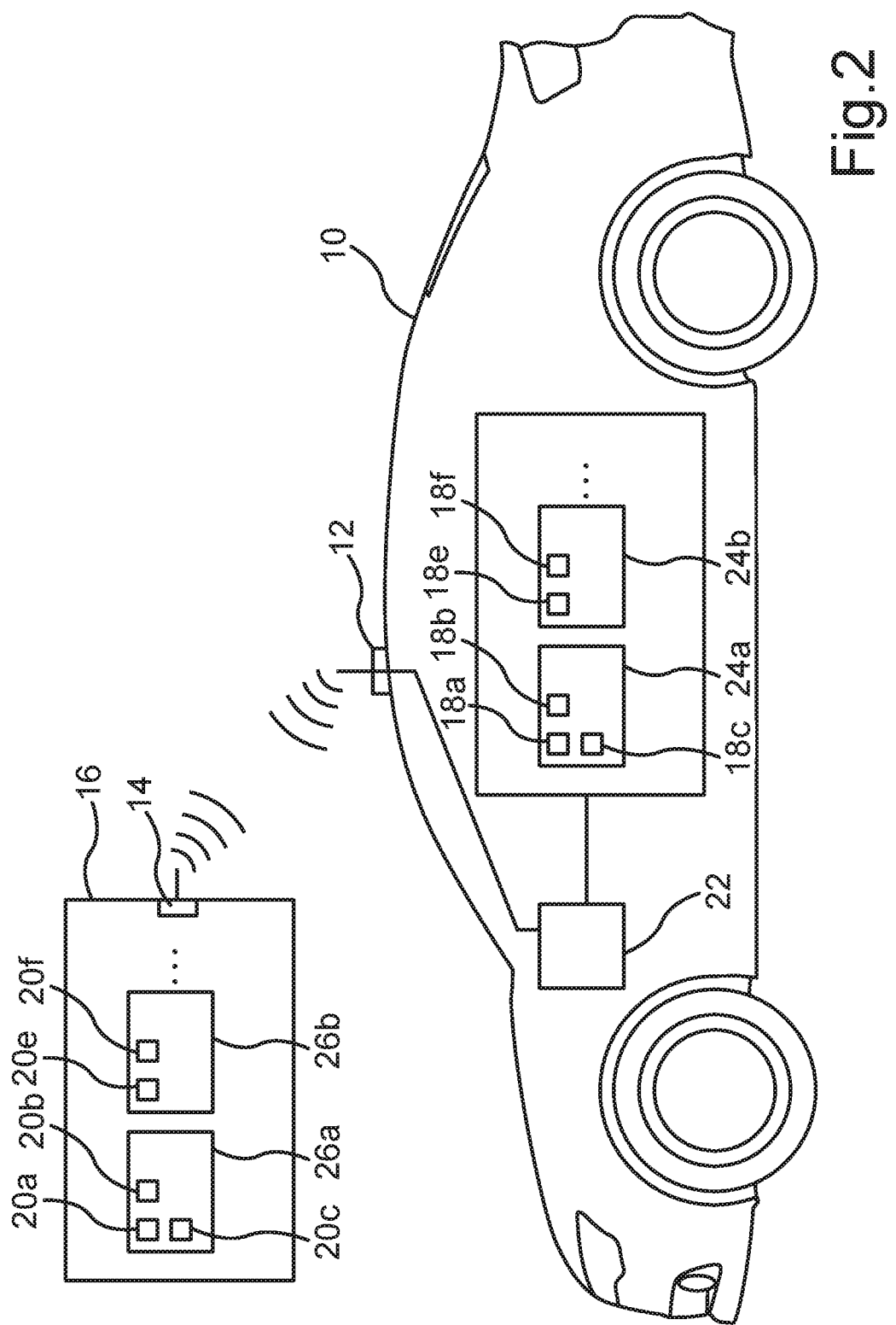
FIG. 2 shows a schematic representation for explaining a system according to the invention for updating operating software for subcomponents of a motor vehicle.

In particular, FIG. 2 shows a motor vehicle 10 which is designed to communicate wirelessly via a transceiver 12 with a transceiver 14 of a backend server 16. The motor vehicle 10 has a plurality of subcomponents 18a to 18f, a digital representation 20a to 20f of which is stored in backend server 16. Strictly speaking, a specific operating software is provided on each of the subcomponents 18a to 18f, wherein a representation of the subcomponents present in the motor vehicle 10 corresponding to the motor vehicle 10 and the versions of the operating software installed on the respective subcomponents of the motor vehicle 10 are stored in the backend server 16, for example in the form of a look-up table.

The method steps explained below are carried out by a control device 22 of motor vehicle 10.

In order to update the operating software of at least one of the subcomponents 18a to 18f, in step S1 a trigger signal for updating the operating software of at least a subset of subcomponents 18a to 18f installed in the motor vehicle 10, the operation of which requires an operating software, is detected.

In a step S2, vehicle functions present in motor vehicle 10 are determined, the execution of which involves a plurality of subcomponents 18a to 18f, which represent different components each with their own operating software.

In step S3, at least the subcomponents 18a to 18f are identified that are involved in the execution of a respectively determined vehicle function.

In step S4, at least one individual function matrix 24a, 24b is created for at least one specific vehicle function, comprising at least the subcomponents 18a to 18f identified for this vehicle function in step S3 and the actual status of the operating software installed on the plurality of subcomponents 18a to 18f. Correspondingly, corresponding representations 26a, 26b of the respective individual function matrices 24a, 24b are present in the backend server 16.

According to FIG. 2, a first vehicle function is represented by the individual function matrix 24a, and a second vehicle function by the individual function matrix 24b, wherein the subcomponents 18a to 18c are used to implement the first vehicle function and the subcomponents 18e and 18f are used to implement the second vehicle function.

In step S5, at least this individual function matrix, that is to say in the present case the individual function matrix 24a and/or the individual function matrix 24b, is transmitted to the backend server 16.

In step S6, the actual status of the operating software installed on the subcomponents 18a to 18f of the transmitted individual function matrix or matrices 24a and/or 24b is then compared in the backend server 16 with a corresponding target status in order to determine differences between the respective actual and target status. If a difference is found between the actual and target status, in step S7 the operating software is updated at least for the subcomponents 18a to 18f of the respective individual function matrix 24a, 24b for which a difference between the actual and target status was determined. For this purpose, a corresponding download link is transmitted to the control device 22 of the motor vehicle 10, for example, so that the control device 22 can download the corresponding current operating software from the backend server 16 and then transmit it to the corresponding subcomponents 18a to 18f.

Finally, in step S8, after the current operating software has been downloaded and copied to the affected subcomponents 18a to 18f, the at least one vehicle function is initialized, in which the operating software of at least one of the plurality of subcomponents 18a to 18f of the associated individual function matrix 24a, 24b has been updated.

In step S4, the individual function matrix 24a, 24b can also be created to include the actual status of artifacts, in particular data sets, and/or external function information that is required to execute the respective determined vehicle function.

It should be emphasized that a plurality of separate operating software can be installed on at least one subcomponent 18a to 18f, which operating software can be associated with different vehicle functions and can be correspondingly identified.

The operating software can comprise a number of software blocks, wherein in step S6 the actual status of the individual software blocks is then compared with the corresponding target status and in step S7 preferably only the software blocks are updated, for which a difference between the actual and target status has been determined in step S6.

In step S5, a system function matrix can be created from the entirety of individual function matrices 24a, 24b of a motor vehicle 10 and transmitted to the backend server 16.

The trigger signal for step S1 can be generated specifically for a vehicle function, in particular cyclically in motor vehicle 10, or by a motor vehicle-external server device, for example the backend server 16, by input from a user, in particular via an input device in motor vehicle 10, by a diagnostic device of a service system, or by determining an "invalid version number" status of at least one individual function matrix 24a, 24b, in particular a system function matrix, wherein this determination can be in particular performed by the control device 22.

For the variant "invalid version number", in step S6, a comparison can be made in a first step with an individual or system function matrix documented with reference to the vehicle 10, wherein, in the case of a positive comparison result, only the valid version number of the individual or system function matrix is transmitted to the vehicle 10 and the method is terminated. This may occur, for example, if one or more memory cells have a so-called "bit-dumping" function or if in one or more subcomponents, especially after swapping or tampering, a modified operating software is detected.

The response of the backend server 16 thus consists only of the version number, wherein the vehicle-internal documentation and the version number status are set to "valid". The changed vehicle function version is then preferably stored on the backend server 16 as a new target specification.

If the result of the comparison is negative, in a second step a comparison is made with an individual or system function matrix, which is provided, tested and homologated for the motor vehicle 10, whereas if the result of the comparison is positive, only the valid version number of the individual or system function matrix is transmitted to the motor vehicle 10 and the method is terminated.

If the result of the comparison in the second step is negative, the method proceeds to step S7. Accordingly, the operating software is only updated if this is actually necessary. If the version number is invalid for the above reasons, only the version number will be updated, provided the operating software of the subcomponents involved is up to date. The data volume to be transmitted and the associated effort can thus be kept low.

The system function matrix is preferably created by sequentially lining up the individual function matrices 24a, 24b, preferably in XML or JSON format, and transmitted to the backend server 16.

The vehicle functions to be determined in step S2 are defined as such in advance. This can be done by the manufacturer by determining the subcomponents, artifacts and external function information involved in the execution of a specific vehicle function.

In step S3, the identification preferably takes place using a name or a data-logistics number, a versioning or unique HASH value, relative to the content of the operating software of the respective subcomponent 18a to 18f.

The updating of the operating software of a specific subcomponent can be obtained by deleting and writing the corresponding memory areas in the respective subcomponent or by writing to a free memory area and then switching over.

At the end of the update, step S8 preferably includes a comparison of the individual function matrices 24a, 24b involved from the update package with those of the new actual status. Only if the information is the same is the procedure considered complete.

The invention claimed is:

1. A method for updating operating software for subcomponents of a motor vehicle, comprising:

a) detecting a trigger signal for updating the operating software of at least a subset of subcomponents installed in the motor vehicle, the operation of which requires an operating software;

b) determining vehicle functions present in the motor vehicle, the execution of which involves multiple subcomponents, which represent different components each with their own operating software;

c) identifying at least the subcomponents involved in the execution of a respective determined vehicle function;

d) creating an individual function matrix for at least one specific vehicle function comprising at least the subcomponents identified for this vehicle function in step c) and the actual status of the operating software respectively installed on the multiple subcomponents;

e) transmitting at least this individual function matrix to a backend server;

f) in the backend server: comparing the actual status of the operating software installed on the subcomponents of the transmitted individual function matrix with a corresponding target status to determine differences between the actual and target status;

g) if a difference is found between the actual and the target status: updating the operating software at least of the subcomponents of the individual function matrix for which a difference between the actual and the target status was found; and h) initializing the at least one vehicle function, for which the operating software was updated for at least one of multiple subcomponents of the associated individual function matrix.

2. The method according to claim 1, wherein in step d), the individual function matrix can also be created to include the actual status of artifacts, in particular data sets, and/or external function information that is required to execute the respective determined vehicle function.

3. The method according to claim 2, wherein multiple separate operating software is installed on at least one subcomponent, which separate software is assigned to different vehicle functions and can be correspondingly identified.

4. The method according to claim 2, wherein the operating software comprises multiple software blocks, wherein in step f) the actual status of the individual software blocks is compared with the corresponding target status and in step g) only the software blocks are updated, for which a difference between the actual and target status has been determined in step f).

5. The method according to claim 2, wherein in step e), a system function matrix is created from the entirety of individual function matrices of a motor vehicle and transmitted to the backend server.

6. The method according to claim 2, wherein the trigger signal for step a) is generated specifically for the vehicle function, in particular
cyclically in the motor vehicle or by a motor vehicle-external server device;
by input from a user;
by a diagnostic device of a service system; or
by determining an "invalid version number" status of at least one individual function matrix (24*a*, 24*b*), in particular a system function matrix.

7. The method according to claim 1, wherein multiple separate operating software is installed on at least one subcomponent, which separate software is assigned to different vehicle functions and can be correspondingly identified.

8. The method according to claim 7, wherein the operating software comprises multiple software blocks, wherein in step f) the actual status of the individual software blocks is compared with the corresponding target status and in step g) only the software blocks are updated, for which a difference between the actual and target status has been determined in step f).

9. The method according to claim 7, wherein in step e), a system function matrix is created from the entirety of individual function matrices of a motor vehicle and transmitted to the backend server.

10. The method according to claim 1, wherein the operating software comprises multiple software blocks, wherein in step f) the actual status of the individual software blocks is compared with the corresponding target status and in step g) only the software blocks are updated, for which a difference between the actual and target status has been determined in step f).

11. The method according to claim 10, wherein in step e), a system function matrix is created from the entirety of individual function matrices of a motor vehicle and transmitted to the backend server.

12. The method according to claim 1, wherein in step e), a system function matrix is created from the entirety of individual function matrices of a motor vehicle and transmitted to the backend server.

13. The method according to claim 12, wherein the system function matrix is created by sequentially lining up the individual function matrices, preferably in XML or JSON format, and transmitted to the backend server.

14. The method according to claim 1, wherein the trigger signal for step a) is generated specifically for the vehicle function, in particular
cyclically in the motor vehicle or by a motor vehicle-external server device;
by input from a user;
by a diagnostic device of a service system; or
by determining an "invalid version number" status of at least one individual function matrix, in particular a system function matrix.

15. The method according to claim 14, wherein if the trigger signal was an invalid version number, in step f), a comparison is made in a first step with an individual or system function matrix documented with reference to the vehicle, wherein, in the case of a positive comparison result, only the valid version number of the individual or system function matrix is transmitted to the vehicle and the method is terminated.

16. The method according to claim 15, wherein if the result of the comparison is negative, in a second step a comparison is made with an individual or system function matrix, which is provided, tested and homologated for the motor vehicle, whereas if the result of the comparison is positive, only the valid version number of the individual or system function matrix is transmitted to the motor vehicle and the method is terminated.

17. The method according to claim 16, wherein if the result of the comparison is negative, the method proceeds to step g).

18. The method according to claim 1, wherein the vehicle functions to be determined in step b) are defined as such in advance.

19. The method according to claim 1, wherein in step c), the identification preferably takes place using a name or a data-logistics number, a versioning or unique HASH value, relative to the content of the operating software of the respective subcomponent.

20. A system for updating an operating software of subcomponents of a motor vehicle, comprising a backend server and a motor vehicle with a plurality of subcomponents, a control device and a transceiver, wherein the control device is configured to:
upon detecting a trigger signal for updating the operating software of at least a subset of the subcomponents installed in the motor vehicle, the operation of which requires an operating software, determining vehicle functions present in the motor vehicle, the execution of which involves multiple subcomponents, which represent different components each with their own operating software;

identifying at least the subcomponents involved in the execution of a respective determined vehicle function;

creating an individual function matrix for at least one specific vehicle function, comprising at least the subcomponents identified for this vehicle function and the actual status of the operating software installed on each of the multiple subcomponents;

wherein the transceiver is coupled with the control device and configured to transmit at least this individual function matrix to the backend server;

wherein the backend server is configured to:
comparing the actual status of the operating software installed on the subcomponents of the transmitted individual function matrix with a corresponding target status and determining differences between the actual and target status; and if a difference between the actual and target status is determined: causing an update of the operating software at least of the subcomponents of the individual function matrix for which a difference between the actual and target status was determined;

wherein the control device is further designed to initialize the at least one vehicle function for which the operating software of at least one of multiple subcomponents of the associated individual function matrix was updated.

* * * * *